US012309179B2

(12) United States Patent
Vogel et al.

(10) Patent No.: US 12,309,179 B2
(45) Date of Patent: May 20, 2025

(54) LOG ENTRY BUFFER EXTENSION NETWORK

(71) Applicant: SAP SE, Walldorf (DE)

(72) Inventors: Matthias Vogel, Saarbruecken (DE); Nathalie Stephanie Bergstroem, Speyer (DE)

(73) Assignee: SAP SE, Walldorf (DE)

( * ) Notice: Subject to any disclaimer, the term of this patent is extended or adjusted under 35 U.S.C. 154(b) by 632 days.

(21) Appl. No.: 17/590,145

(22) Filed: Feb. 1, 2022

(65) Prior Publication Data

US 2023/0247034 A1 Aug. 3, 2023

(51) Int. Cl.
*H04L 9/40* (2022.01)

(52) U.S. Cl.
CPC ...... *H04L 63/1425* (2013.01); *H04L 63/0435* (2013.01); *H04L 63/062* (2013.01)

(58) Field of Classification Search
None
See application file for complete search history.

(56) References Cited

U.S. PATENT DOCUMENTS 5,592,618 A * 1/1997 Micka ................. G06F 11/2074 714/E11.107
5,621,795 A * 4/1997 Baker ..................... H04L 9/083 713/150
5,864,665 A * 1/1999 Tran ........................ G06F 21/33 713/182
5,978,475 A * 11/1999 Schneier ............. G06F 21/6209 713/177
7,395,436 B1 * 7/2008 Nemovicher ....... H04L 63/0823 726/28
7,653,633 B2 * 1/2010 Villella ............... G06F 11/3476 707/648
8,060,396 B1 * 11/2011 Bessler .............. G06Q 10/0633 705/7.22
8,626,908 B2 * 1/2014 Wilson .................... G06F 9/542 709/224
9,378,361 B1 * 6/2016 Yen ......................... H04L 63/14
9,710,859 B1 * 7/2017 Theimer ................ G06Q 40/10
10,075,425 B1 * 9/2018 Waugh ................ H04L 63/1425
10,154,052 B1 * 12/2018 Mcclintock ........... H04L 67/141
10,554,416 B1 * 2/2020 Yavuz ................... H04L 9/3242
(Continued)

*Primary Examiner* — Kambiz Zand
*Assistant Examiner* — Mahabub S Ahmed
(74) *Attorney, Agent, or Firm* — SCHWEGMAN LUNDBERG & WOESSNER, P.A.

(57) ABSTRACT

Applications create log entries comprising data regarding operations performed by the applications. The log entries are provided to an audit-log service to allow auditing of the log entries. An audit-log sidecar for each application is used to send log entries to the audit-log service. The audit-log service may experience downtime. If the audit-log service is unavailable, the log entries are sent to one or more other audit-log sidecars for storage. When the audit-log service again becomes available, all audit-log sidecars send their stored log entries to the audit-log service. In this way, the audit-log service is enabled to determine if there is a discrepancy between log entries reported by an application and log entries reported for the application by other audit-log sidecars. As a result, an attack on an application will not go undetected, even if the attack occurs while the audit-log service is unavailable.

20 Claims, 11 Drawing Sheets

(56) References Cited

U.S. PATENT DOCUMENTS

| | | | | |
|---|---|---|---|---|
| 10,681,060 | B2 * | 6/2020 | Scheidler | G06N 20/00 |
| 10,917,401 | B1 * | 2/2021 | Mantin | H04L 63/1441 |
| 10,963,971 | B1 * | 3/2021 | Greene | G06Q 40/12 |
| 11,487,777 | B1 * | 11/2022 | Bose | G06F 16/2455 |
| 11,625,309 | B1 * | 4/2023 | Chen | G06F 11/3075 714/37 |
| 11,876,822 | B1 * | 1/2024 | McDonald | H04L 63/1466 |
| 2002/0046275 | A1 * | 4/2002 | Crosbie | G06F 21/552 709/224 |
| 2003/0014619 | A1 * | 1/2003 | Cheston | G06F 9/4406 713/1 |
| 2005/0138111 | A1 * | 6/2005 | Aton | G06F 11/3476 709/201 |
| 2006/0117091 | A1 * | 6/2006 | Justin | G06F 11/3476 714/E11.204 |
| 2006/0218204 | A1 * | 9/2006 | Ofer | G06F 11/202 |
| 2007/0294271 | A1 * | 12/2007 | Bammi | G06F 21/552 |
| 2011/0055371 | A1 * | 3/2011 | Serban | H04L 63/1425 709/224 |
| 2011/0238855 | A1 * | 9/2011 | Korsunsky | H04L 63/1441 709/231 |
| 2012/0101800 | A1 * | 4/2012 | Miao | G06F 11/3692 703/22 |
| 2012/0110038 | A1 * | 5/2012 | Volvovski | G06F 16/50 707/822 |
| 2013/0007836 | A1 * | 1/2013 | Stevenson | H04L 63/1425 726/1 |
| 2013/0191920 | A1 * | 7/2013 | Amit | G06F 21/552 726/25 |
| 2014/0081699 | A1 * | 3/2014 | Bammi | G06F 21/552 705/7.28 |
| 2014/0160514 | A1 * | 6/2014 | Matsuyama | H04N 1/32609 358/1.14 |
| 2014/0173712 | A1 * | 6/2014 | Ferdinand | H04L 63/0236 726/11 |
| 2015/0296242 | A1 * | 10/2015 | Khalil | H04N 21/26283 725/43 |
| 2016/0255114 | A1 * | 9/2016 | Hathaway | H04L 63/1425 726/1 |
| 2016/0342798 | A1 * | 11/2016 | Smith | G06F 21/74 |
| 2017/0091463 | A1 * | 3/2017 | Lindteigen | G06F 21/602 |
| 2017/0139806 | A1 * | 5/2017 | Xu | G06F 11/3612 |
| 2017/0177861 | A1 * | 6/2017 | Sunada | G06F 21/54 |
| 2017/0230347 | A1 * | 8/2017 | Lopez | H04L 63/061 |
| 2018/0150536 | A1 * | 5/2018 | Lai | G06F 16/2246 |
| 2018/0196958 | A1 * | 7/2018 | Chari | G06F 21/577 |
| 2019/0171633 | A1 * | 6/2019 | Demla | G06F 16/2365 |
| 2019/0207771 | A1 * | 7/2019 | Hecht | H04L 63/1408 |
| 2019/0213274 | A1 * | 7/2019 | Cadarette | G06F 16/27 |
| 2020/0125586 | A1 * | 4/2020 | Rezaeian | G06F 3/048 |
| 2020/0296117 | A1 * | 9/2020 | Karpovsky | G06F 21/552 |
| 2020/0334123 | A1 * | 10/2020 | Chatterjee | G06F 11/0793 |
| 2021/0073097 | A1 * | 3/2021 | Upadhyay | G06F 11/0757 |
| 2021/0073190 | A1 * | 3/2021 | Bedadala | G06F 16/215 |
| 2021/0279329 | A1 * | 9/2021 | Hong | H04L 63/1416 |
| 2021/0374021 | A1 * | 12/2021 | Santhakumar | G06N 3/08 |
| 2022/0038485 | A1 * | 2/2022 | Albero | H04L 63/1441 |
| 2022/0141186 | A1 * | 5/2022 | Smith | H04L 63/20 726/25 |
| 2022/0191769 | A1 * | 6/2022 | Breaux, III | H04M 1/72463 |
| 2022/0224711 | A1 * | 7/2022 | Singh | G06F 21/552 |
| 2022/0237101 | A1 * | 7/2022 | Singh | G06F 11/3438 |
| 2023/0079432 | A1 * | 3/2023 | Kawaguchi | G06F 3/0611 726/22 |
| 2023/0137119 | A1 * | 5/2023 | Zhang | G06F 16/2365 |
| 2023/0137235 | A1 * | 5/2023 | Chen | G06F 11/3476 714/37 |
| 2023/0195751 | A1 * | 6/2023 | Sun | G06F 16/273 707/615 |

* cited by examiner

300

| 310 | INCOMING AUDIT-LOG TABLE | | | |
|---|---|---|---|---|
| 320 | APPLICATION ID | INTERMEDIARY APPLICATION | TIMESTAMP | MESSAGE |
| 330A | 1 | NULL | 2021-11-19 08:12:53 | DATA PROCESSED ... |
| 330B | 2 | NULL | 2021-11-19 08:12:54 | INPUT RECEIVED ... |
| 330C | 2 | 1 | 2021-11-19 08:12:55 | REPORT GENERATED ... |
| 330D | 2 | NULL | 2021-11-19 08:12:55 | REPORT GENERATED ... |

| 340 | AUDIT-LOG TABLE | | |
|---|---|---|---|
| 350 | APPLICATION ID | TIMESTAMP | MESSAGE |
| 360A | 1 | 2021-11-19 08:12:53 | DATA PROCESSED ... |
| 360B | 2 | 2021-11-19 08:12:54 | INPUT RECEIVED ... |
| 360C | 2 | 2021-11-19 08:12:55 | REPORT GENERATED ... |

LOG ENTRY BUFFER EXTENSION NETWORK

TECHNICAL FIELD

The subject matter disclosed herein generally relates to data auditing. Specifically, the present disclosure addresses systems and methods for a log entry buffer extension network.

BACKGROUND

Applications send log entries to an audit-log service. If an attack is made on an application, analysis of the log entries for the application may reveal the attack and its source. However, every system has some down time. When the audit-log service is down, the applications either waits for the audit-log service to resume or proceeds, even though logging is unavailable.

BRIEF DESCRIPTION OF THE DRAWINGS

FIG. 3 is a block diagram of an example database schema suitable for use by an audit-log service with a log entry buffer extension network.

DETAILED DESCRIPTION

Applications create log entries comprising data regarding operations performed by the applications. The log entries are provided to an audit-log service to allow auditing of the log entries. Auditing of the log entries may be performed to ensure compliance of the applications with laws and regulations, to detect attacks on the applications, or both.

The audit-log service may experience downtime (e.g., due to a server on which the audit-log service runs being rebooted, due to the audit-log service being upgraded to a newer version, due to a power outage, or due to another cause). While the audit-log service is unavailable, an application may store generated log entries locally instead of transferring the log entries to the audit-log service. When the audit-log service resumes, the stored log entries are transferred to the audit-log service. However, if the application is compromised while the audit-log service is unavailable, the attacker may be able to manipulate or delete the stored log entries to avoid detection.

As described herein, an audit-log sidecar for each application is used to send log entries to the audit-log service. An audit-log sidecar is a library, module, or co-executing application. If the audit-log service is unavailable, the log entries are sent to one or more other audit-log sidecars for storage. When the audit-log service again becomes available, all audit-log sidecars send their stored log entries to the audit-log service. In this way, the audit-log service is enabled to determine if there is a discrepancy between log entries reported by an application and log entries reported for the application by other audit-log sidecars. As a result, an attack on an application will not go undetected, even if the attack occurs while the audit-log service is unavailable.

The audit-log service may determine, for each audit-log sidecar, which other audit-log sidecars the audit-log sidecar will send log entries to. For example, the audit-log service may determine that each audit-log sidecar will send log entries to all other audit-log sidecars. As another example, the audit-log service may randomly select a predetermined number (e.g., 1, 2, or 3) of other audit-log sidecars for the audit-log sidecar to send entries to. In a multi-tenant environment, different applications may process data for different tenants. To protect the privacy of tenant data, the audit-log service may ensure that log entries are only transferred between audit-log sidecars of applications assigned to the same tenant. Additionally or alternatively, the log entries may be encrypted using symmetric or asymmetric encryption methods, such that no other application or audit-log sidecar can decrypt the log entries.

Figure 1:
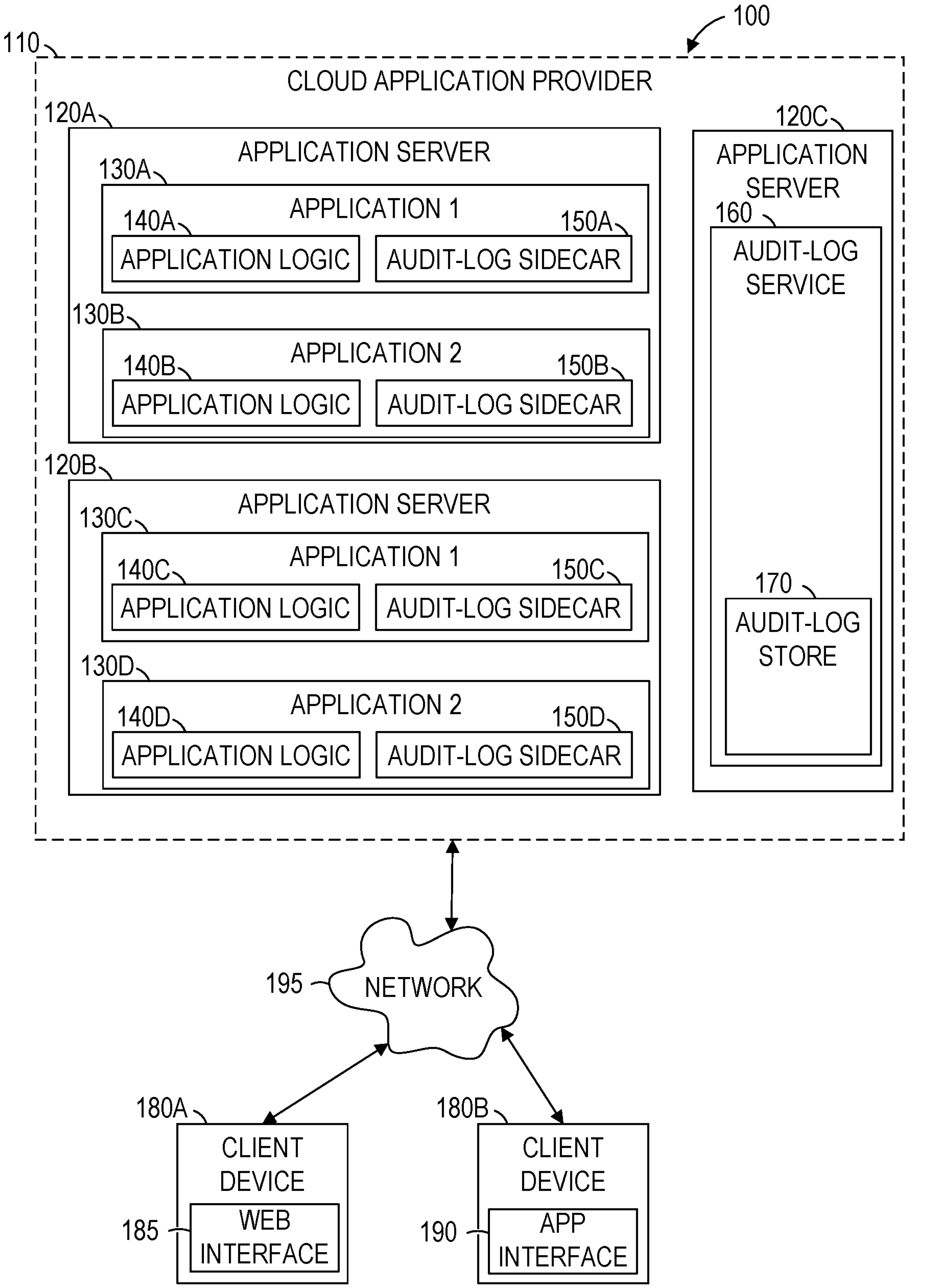
FIG. 1 is a network diagram illustrating an example network environment suitable for using a log entry buffer extension network to provide log entries to an audit-log service even if the audit-log service experiences downtime.

FIG. 1 is a network diagram illustrating an example network environment 100 suitable for using a log entry buffer extension network to provide log entries to an audit-log service even if the audit-log service experiences downtime. The network environment 100 includes a cloud application provider 110, client devices 180A and 180B, and a network 195. The cloud application provider 110 provides applications 130A, 130B, 130C, and 130D using application servers 120A and 120B. The applications 130A-130D (and other applications) may be dynamically allocated among the application servers 120A-120B (and other application servers). Each application 130 includes application logic and an audit-log sidecar, denoted in FIG. 1 with reference numbers 140A-140D and 150A-150D, respectively. The cloud application provider also uses an application server 120C, providing an audit-log service 160 using audit-log store 170. The applications 130A-130D interact with the client devices 180A and 180B via a web interface 185 or an application interface 190.

The application servers 120A-120C and the client devices 180A and 180B may each be implemented in a computer system, in whole or in part, as described below with respect to FIG. 11. Like elements denoted with alphabetic suffixes may be referenced collectively or generically using the numeric reference without a suffix. For example, the client devices 180A and 180B may be referred to collectively as client devices 180 or generically as a client device 180.

The application logic 140 of each application 130 provides application-specific instructions to the corresponding application server 120. For example, a report-generating application may receive user selections of data to be included in a report, access data from a database, process the data to generate the report, and cause a user interface to be presented on a client device 180, the user interface including the report. The audit-log sidecar 150 of each application 130 provides audit-log functionality. Thus, the creator of each application 130 does not need to recreate the audit-log functionality, but instead integrates that functionality through use of the audit-log sidecar 150.

The audit-log sidecars 150A-150D receive messages (e.g., function calls) from the application logic 140A-140D. Each message includes data for one or more log entries. In response to receiving a message, the audit-log sidecar 150 provides one or more log entries to the audit-log service 160.

The audit-log store 170 stores data for use by the audit-log service. For example, log entries may be stored with data indicating which application the log entry was received from, which application originated the log entry, a timestamp indicating when the log entry was received, a timestamp indicating when the log entry was generated, an identifier of a user of the application that generated the log entry, the contents of the log entry, or any suitable combination thereof.

If an audit-log sidecar 150 attempts to provide a log entry to the audit-log service 160 but is unable to do so (e.g., due to failure to receive an acknowledgement from the audit-log service 160 within a predetermined period of time), the audit-log sidecar 150 provides the log entry to one or more other audit-log sidecars 150. Later, when the audit-log service 160 becomes available again, data stored by the audit-log sidecars 150 is provided to the audit-log service 160 for auditing.

When the audit-log service 160 receives the data from the audit-log sidecars 150, duplicate data is compared (e.g., a log entry from the audit-log sidecar 150A that originally sent the log entry and a copy of the log entry from the audit-log sidecar 150B that received a copy of the log entry while the audit-log service 160 was unavailable). If discrepancies are determined or missing data is detected, the audit-log service 160 generates an alert to an administrator (e.g., via a text message, via email, via a web interface, or any suitable combination thereof).

The cloud application provider 110 may be a multi-tenant application provider, such that multiple tenants (also referred to as customers) are associated with the applications 130. For example, the applications 130A and 130C may be associated with a first tenant, the application 130B may be associated with a second tenant, and the application 130D may be associated with a third tenant. Each of the applications 130 may be accessible only by user accounts associated with the tenant for the application 130.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 120 and the client devices 180 are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
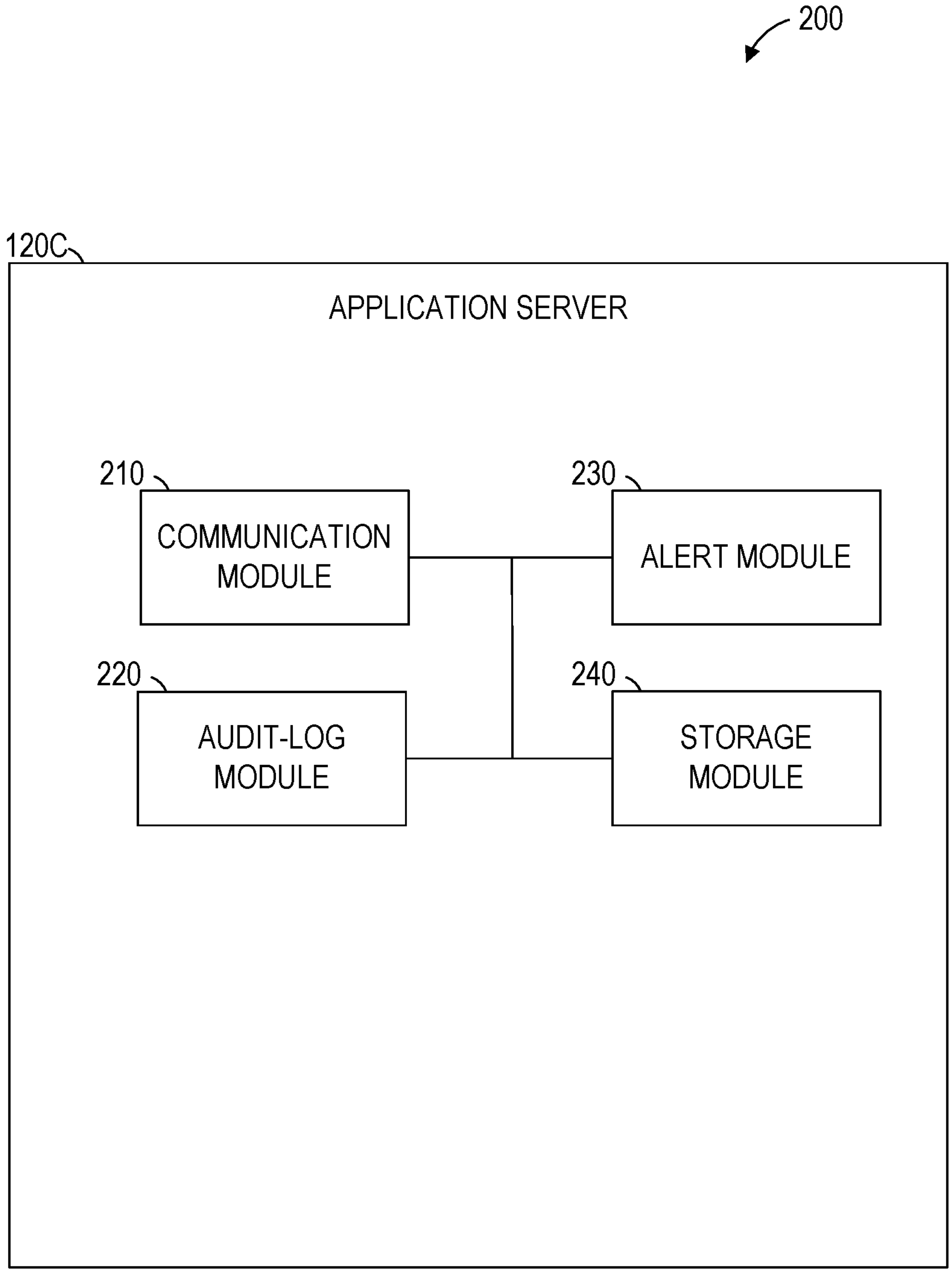
FIG. 2 is a block diagram of an example application server suitable for using a log entry buffer extension network.

FIG. 2 is a block diagram 200 of an example application server 120C of FIG. 1 suitable for using a log entry buffer extension network. The application server 120C is shown as including a communication module 210, an audit-log module 220, an alert module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 120C and transmits data from the application server 120C. For example, the communication module 210 may receive, from the application server 120A or 120B of FIG. 1, log entries to be stored in the audit-log store 170. Communications sent and received by the communication module 210 may be intermediated by the network 195 of FIG. 1.

The audit-log module 220 provides the audit-log service 160 of FIG. 1. The audit-log module 220 receives log entries from the audit-log sidecars 150A-150D of FIG. 1 and stores them in the audit-log store 170 of FIG. 1 using the storage module 240. The audit-log module 220 may also select, for each audit-log sidecar 150 of FIG. 1, one or more other audit-log sidecars 150. The audit-log module 220 sends an identifier for each selected audit-log sidecar 150 to the audit-log sidecar 150 for which it is selected. During periods in which the audit-log service 160 is unavailable, the log entries are sent to the selected audit-log sidecars instead of to the audit-log service 160 of FIG. 1.

When the audit-log module 220 resumes providing the audit-log service 160, each audit-log sidecar 150 sends its stored log entries. The audit-log module 220 identifies duplicate entries and stores only one of the duplicates. The audit-log module 220 also identifies discrepancies between entries and, using the alert module 230, generates an alert. The alert may be an email or text message sent to a predetermined email address or phone number. The alert may include information about the application or applications that generated the discrepancies.

FIG. 3 is a block diagram of an example database schema 300 suitable for use by an audit-log service with a log entry buffer extension network. The database schema 300 includes an incoming audit-log table 310 and an audit-log table 340. The incoming audit-log table 310 includes rows 330A, 330B, and 330C of a format 320. The audit-log table 340 includes rows 360A, 360B, and 360C of a format 350.

Each row of the incoming audit-log table 310 stores an application identifier, an intermediary application identifier, a timestamp, and a message for an incoming log entry. The application identifier is a unique identifier of the application that generated the log entry. The intermediary application identifier is a unique identifier of the application that provided the log entry to the audit-log service, if different from the application identifier. The timestamp stores the date and time at which the log entry was generated. The message is the contents of the log entry. Thus, the incoming log entry of the row 330A was generated by the application with identifier 1 (e.g., the application 130A of FIG. 1) and provided directly to the audit-log service without using an intermediary application. The incoming log entries of the rows 330B-330D were generated by the application with identifier 2 (e.g., the application 130B of FIG. 1). Two of these entries were provided directly to the audit-log service without using an intermediary application (rows 330B and 330D) and the other was provided via the application with identifier 1 (row 330C).

The audit-log table 340 stores an application identifier, a timestamp, and a message for each log entry. The fields of the audit-log table 340 are the same as those of the incoming audit-log table 310, except that the intermediary application identifier has been removed.

The audit-log service 160 receives log entries from the audit-log sidecars 150 and stores the log entries in the incoming audit-log table 310. Data is copied from the incoming audit-log table 310 to the audit-log table 340. Duplicate entries of the incoming audit-log table 310 (e.g., the log entries of the rows 330C and 330D) are de-duplicated and stored only once in the audit-log table 340 (e.g., as the log entry of the row 360C).

If the audit-log service 160 detects conflicting log entries (e.g., entries with the same originating application and timestamp but different messages) or missing log entries (e.g., a log entry received via an intermediary application but not received from the originating application), an alert is generated.

Figure 4:
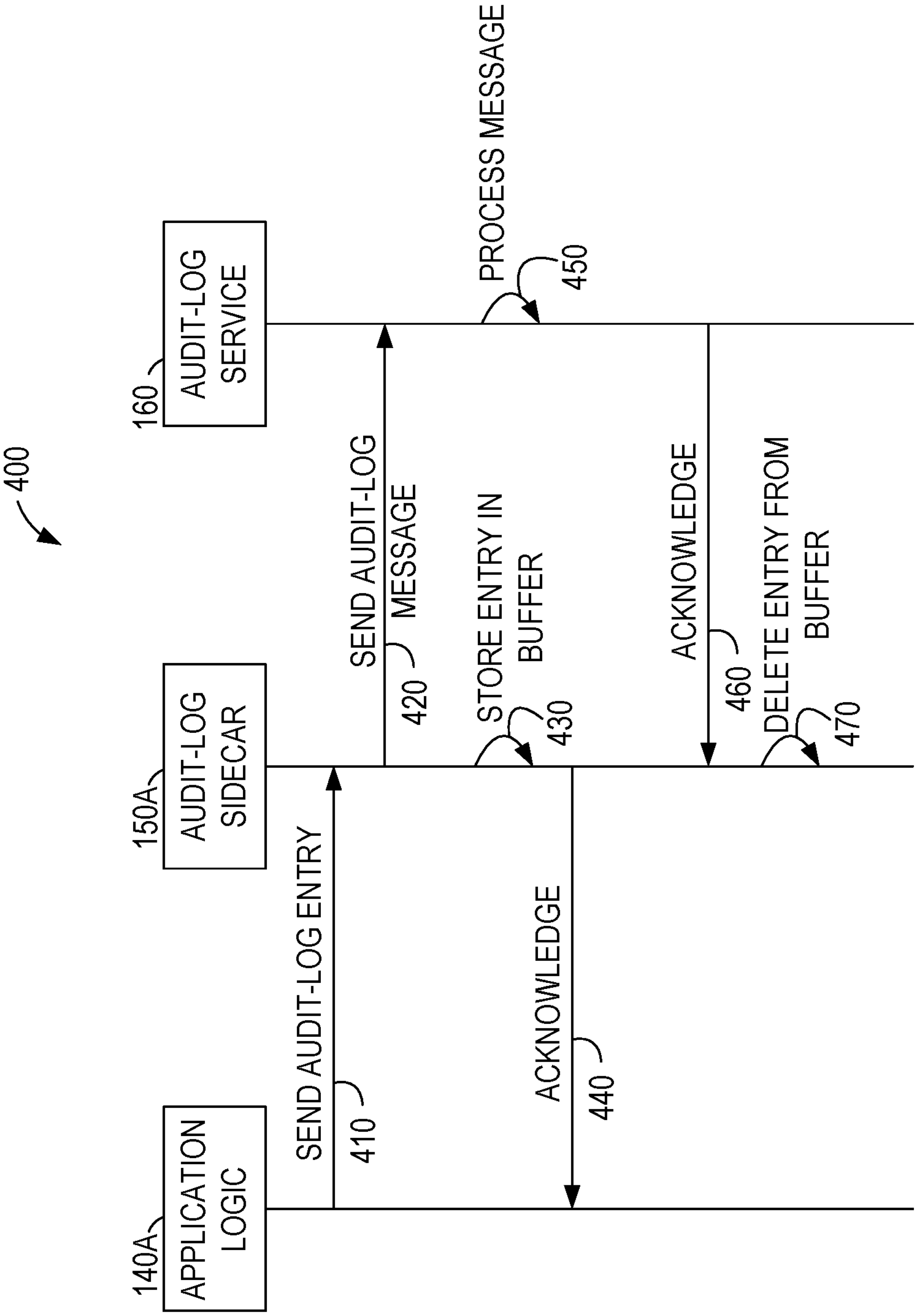
FIG. 4 is a swimlane diagram showing communications between application logic, an audit-log sidecar, and an audit-log service in using a log entry buffer extension network.

FIG. 4 is a swimlane diagram 400 showing communications between the application logic 140A of FIG. 1, the audit-log sidecar 150A of FIG. 1, and the audit-log service 160 of FIG. 1 in using a log entry buffer extension network. The swimlane diagram 400 includes communications 410, 420, 440, and 460; and operations 430, 450, and 470.

The application logic 140A sends the communication 410 to the audit-log sidecar 150A to store an audit-log entry. The communication 410 includes a message for an audit-log entry. The communication 410 may be sent using a function call, an inter-process communication, a remote procedure call, a representational state transfer (REST) application programming interface (API), or any suitable combination thereof. In response to receiving the communication 410, the audit-log sidecar 150A sends an audit-log message to the audit-log service 160 in communication 420. The audit-log sidecar 150A also stores the received entry in a local buffer in operation 430. After storing the entry in the local buffer, the audit-log sidecar 150A acknowledges receipt of the audit-log entry via communication 440. The acknowledgement of the communication 440 allows the application logic 140A to continue processing with confidence that the audit-log entry was (or will be) processed.

The audit-log server 160 processes the audit-log message received in communication 420 and, in communication 460, acknowledges the receipt of the message to the audit-log sidecar 140B of FIG. 1. After receiving the acknowledgement from the audit-log service 160 (and thus confirming that the audit-log message has been processed by the audit-log service 160), the audit-log sidecar 150A deletes the entry stored in operation 430 from the buffer (operation 470).

If the audit-log service 160 is unavailable or otherwise unable to process the audit-log message of the communication 420, the acknowledgment of the communication 460 will be delayed or not received. In that event, the entry stored in the local buffer of the audit-log sidecar 150A will be retained, ensuring that the log entry is not lost. The audit-log message may be re-sent by the audit-log sidecar 150A in response to the elapse of a predetermined period of time. Alternatively, the audit-log service 160 may request one or more audit-log sidecars 150 to send buffered data when the audit-log service 160 becomes available again (e.g., after the audit-log service 160 is restarted).

Figure 5:
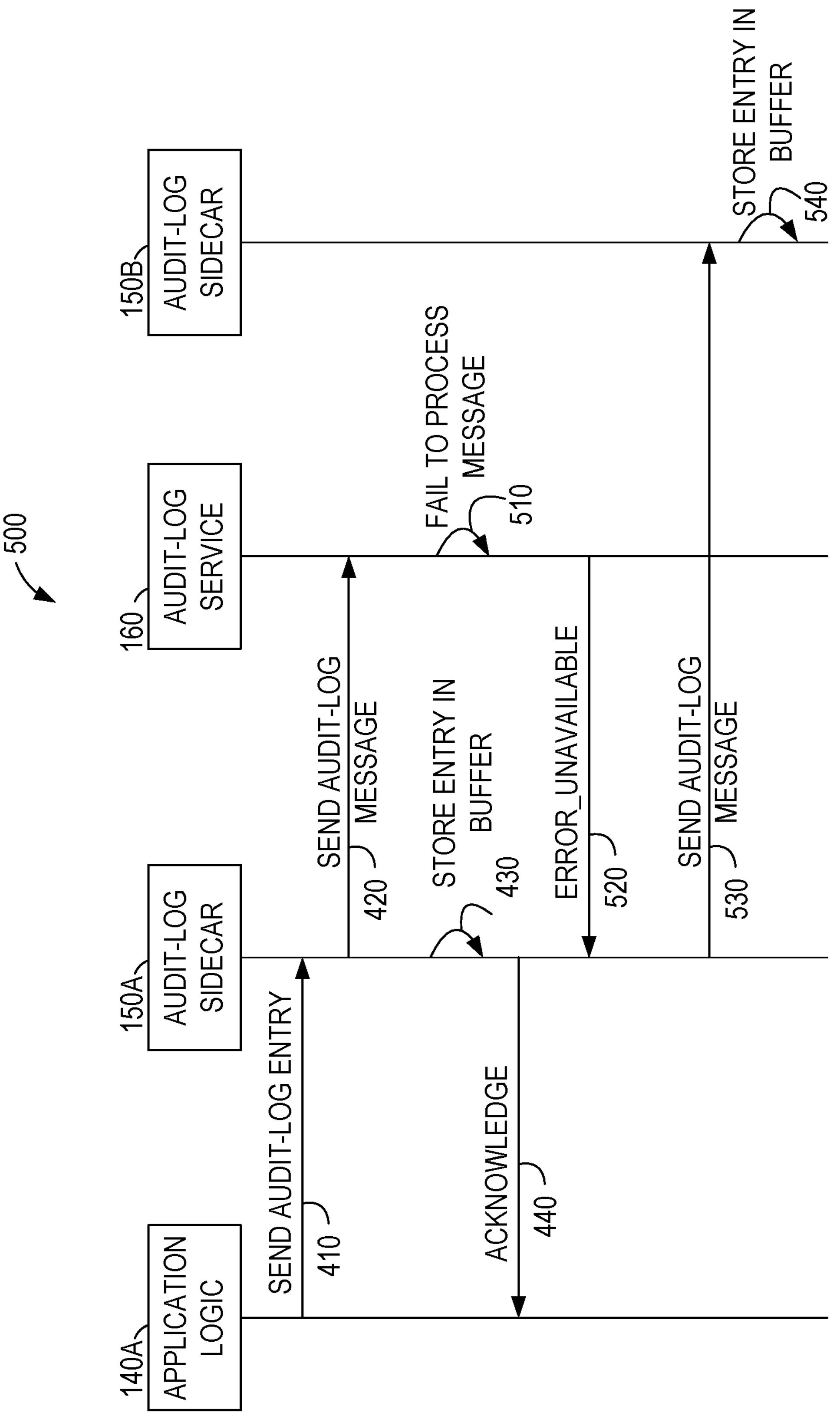
FIG. 5 is a swimlane diagram showing communications between application logic, multiple audit-log sidecars, and an audit-log service in using a log entry buffer extension network.

FIG. 5 is a swimlane diagram 500 showing communications between application logic 140A, multiple audit-log sidecars 150, and the audit-log service 160 of FIG. 1 in using a log entry buffer extension network. The swimlane diagram 500 includes communications 410, 420, 440, 520, and 530; and operations 430, 510, and 540. The communications 410, 420, and 440, as well as the operation 430, are as described above with respect to FIG. 4.

In the swimlane diagram 500, operation 450 of FIG. 4 is replaced with operation 510. In operation 510, the audit-log service 160 of FIG. 1 fails to process the log entry received in the communication 420. The failure may have a variety of causes such as lack of local storage space, lack of connectivity to network storage, lack of processing resources, or any suitable combination thereof. In response to detecting that the processing of the message failed, the audit-log service 160 sends an error message to the audit-log sidecar 150A in communication 520. In response to receiving the communication 520, the audit-log sidecar 150A sends the audit-log message in communication 530 to the audit-log sidecar 150B. In response to receiving the communication 530, the audit-log sidecar 150B stores the entry in a local buffer, in operation 540.

Thus, after performance of the communications and operations of the swimlane diagram 500, the log entry is stored in local buffers of both the audit-log sidecar 150A and the audit-log sidecar 150B. As a result, if an attacker is able to modify the log entries stored in one of the audit-log sidecars 150, a discrepancy in the logs will be detected, allowing detection of the attack.

Figure 6:
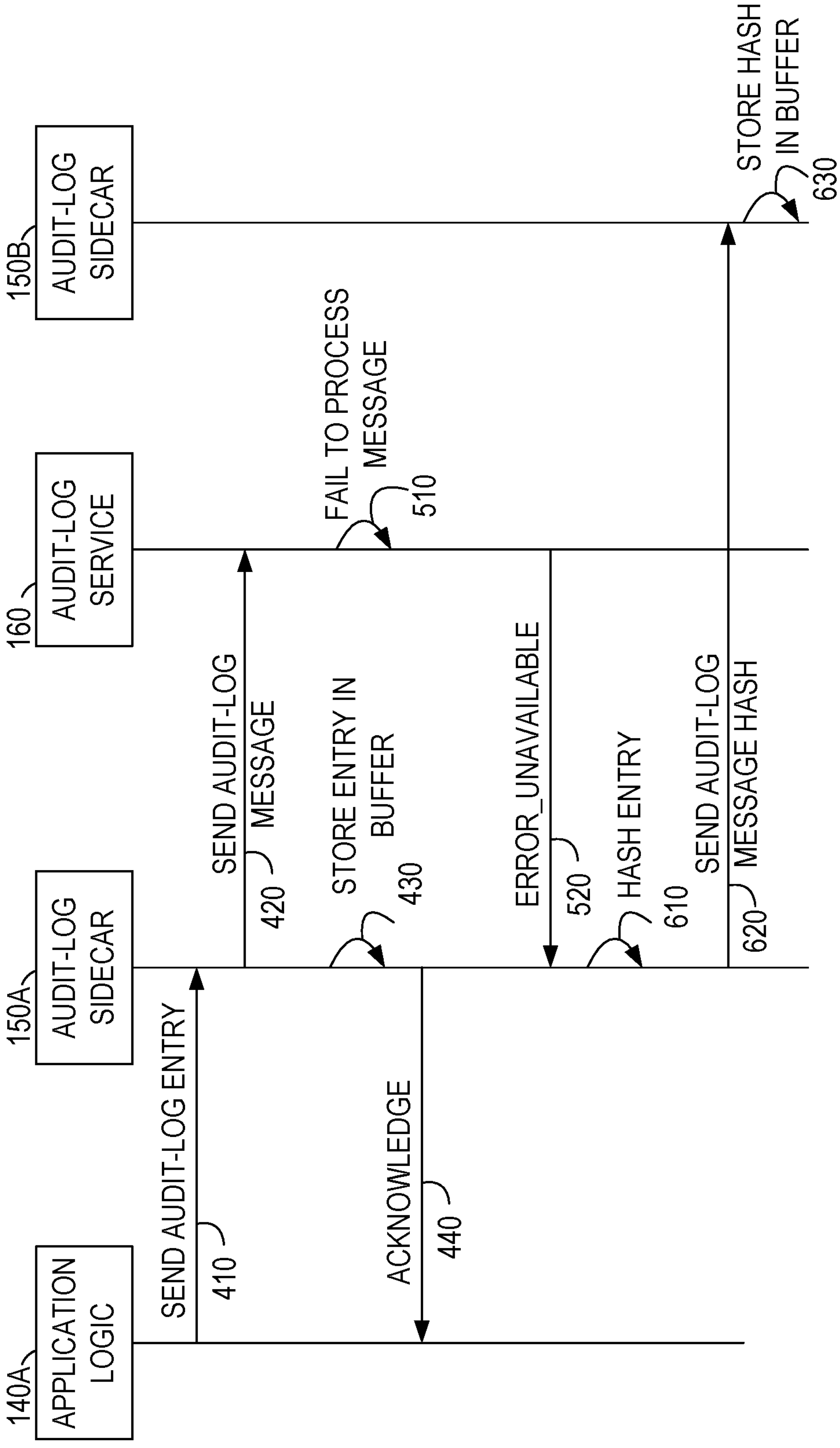
FIG. 6 is a swimlane diagram showing communications between application logic, multiple audit-log sidecars, and an audit-log service in using a log entry buffer extension network.

FIG. 6 is a swimlane diagram 600 showing communications between application logic 140A, multiple audit-log sidecars 150, and the audit-log service 160 of FIG. 1 in using a log entry buffer extension network. The swimlane diagram 600 includes communications 410, 420, 440, 520, and 620; and operations 430, 510, 610, and 630. The communications 410, 420, 440, and 520, as well as the operations 430 and 510, are as described above with respect to FIGS. 4-5.

In the swimlane diagram 600, the audit-log sidecar 150A hashes the audit-log entry in operation 610. The hashing operation may be performed using a cryptographic hash. The hashing operation is irreversible, such that a recipient of the hash is unable to reconstruct the audit-log entry. In communication 620, the audit-log sidecar 150A sends the hash of the audit-log message to the audit-log sidecar 150B. The audit-log sidecar 150B stores the hash in a buffer. Later, a system with access to both the audit-log entry and the hash will be able to determine if the audit-log entry was modified or deleted.

Thus, after performance of the communications and operations of the swimlane diagram 600, the log entry is stored in the local buffer of the audit-log sidecar 150A, and the hash of the log entry is stored in the local buffer of the audit-log sidecar 150B. As a result, if an attacker is able to modify the log entries stored in one of the audit-log sidecars 150, a discrepancy between the log entry and the hash will be detected, allowing detection of the attack.

Figure 7:
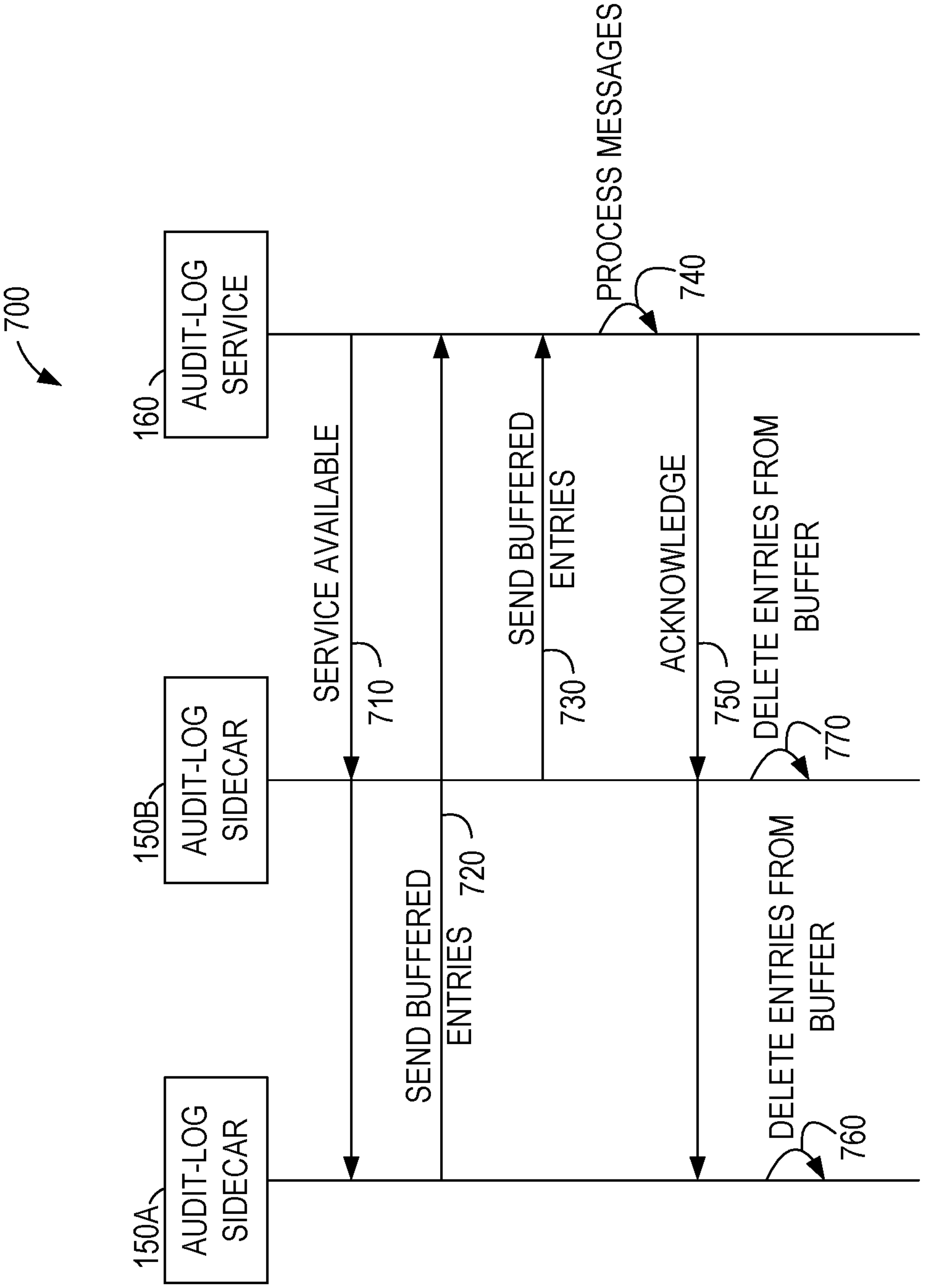
FIG. 7 is a swimlane diagram showing communications between multiple audit-log sidecars, and an audit-log service in using a log entry buffer extension network.

FIG. 7 is a swimlane diagram showing communications between multiple audit-log sidecars 150 and the audit-log service 160 of FIG. 1 in using a log entry buffer extension network. The swimlane diagram 700 includes communications 710, 720, 730, and 750; and operations 740, 760, and 770. The communications and operations of the swimlane diagram 700 may be performed after the communications and operations of the swimlane diagram 500 or 600.

In communication 710, the audit-log service 160 informs the audit-log sidecar 150A and the audit-log sidecar 150B that the audit-log service 160 is available. In response to receiving the communication 710, the audit-log sidecars 150A and 150B send the log entries that were buffered while the audit-log service 160 was unavailable, in communications 720 and 730.

After receiving the communications 720 and 730, the audit-log service 160 processes the received log entries (operation 740). The processing of the received log entries may be performed in response to receiving buffered log entries from all audit-log sidecars 150, in response to an elapse of a predetermined period of time after sending the communication 710, or any suitable combination thereof. The processing of the received log entries may include detecting duplicate entries, detecting inconsistencies between received log entries, detecting missing log entries, generating one or more alerts in response to detecting inconsistent or missing log entries, or any suitable combination thereof.

When the swimlane diagram 600 of FIG. 6 is used, the audit-log sidecar 150B sends the buffered log entries generated by the application 150B and the hashes of the log entries generated by the application 150A. The processing of the received log entries may include detecting missing or modified log entries by generating a hash of the received log entries and comparing the generated hashes with the received hashes.

After processing the messages in operation 740, the audit-log service 160 acknowledges receipt of the log entries from the audit-log sidecars 150 (communication 750). In response to receiving the acknowledgement, the audit-log sidecars 150 delete the stored log entries from their buffers (operation 760 and 770).

Thus, by use of the communications and operations in the swimlane diagrams 400 of FIG. 4, 500 of FIG. 5, 600 of FIG. 6, and 700, the audit-log sidecars 150 ensure that log entries generated by applications 140 are eventually received and processed by the audit-log service 160, even if the audit-log service 160 experiences a period of unavailability. Additionally, by virtue of sending the audit log entries to other audit-log sidecars 150 if the audit-log service 160 is unavailable, suspicious activity on any single application 140 of FIG. 1 can be detected, either in the log entries of the corresponding audit-log sidecar 150 or, if the local buffer of the audit-log sidecar 150 is compromised, in the duplicated log entries stored by another audit-log sidecar 150.

Figure 8:
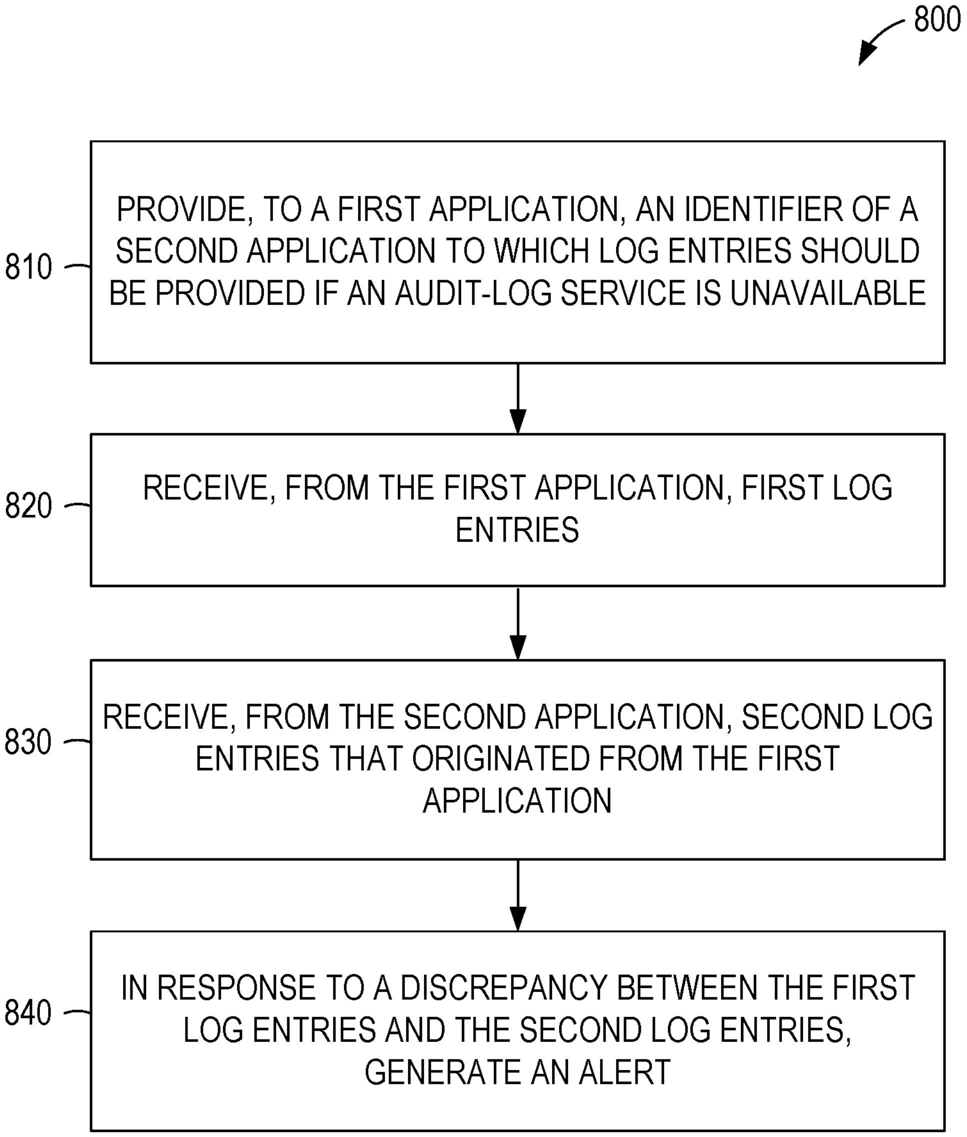
FIG. 8 is a flowchart illustrating operations of an example method suitable for generating an alert by an audit-log service based on data received from a log entry buffer extension network.

FIG. 8 is a flowchart illustrating operations of an example method 800 suitable for generating an alert by an audit-log service based on data received from a log entry buffer extension network. The method 800 includes operations 810, 820, 830, and 840. By way of example and not limitation, the method 800 is described as being performed by the audit-log service 160 of the application server 120C of FIG. 1, using the modules of FIG. 2 and the database schema of FIG. 3.

In operation 810, the audit-log module 220 provides, to a first application, an identifier of a second application to which log entries should be provided if the audit-log service 160 is unavailable. For example, the audit-log service 160 may provide an identifier of the application 130B to the application 130A. The audit-log server 160 may randomly select, for each first application 130 of FIG. 1, a second application 130 to receive the audit-log entries of the first application 130. Alternatively, the identifiers for the applications 130 may be placed in an ordered list (e.g., in the order in which the applications 130 connect to or register with the audit-log server 160) and provide identifiers of second applications to first applications based on the relative positions of the identifiers in the ordered list. For example, each application 130 could receive the identifier of the following application 130 in the list, with the last application 130 receiving the identifier of the first application 130 in the list.

As another example, the second applications 130 may be selected based on whether the first and second applications 130 are running on the same application server 120. Backing up audit-log data on a different application server 120 may be selected, since it is more likely that an attacker will be able to compromise multiple applications 130 running on a single application server 120. Alternatively, backing up audit-log data on the same application server 120 may be selected in order to reduce network traffic and allow an application 130 to continue running when network connectivity to other application servers 120 is lost.

The audit-log server 160 may determine a set of available applications 130 for the first application 130. The second application 130 to which log entries should be provided if the audit-log service 160 is unavailable may be selected from the determined set of available applications 130. Each application 130 may be associated with a customer. To protect the privacy of customer data in the audit-log entries, the set of available applications 130 may exclude applications 130 associated with customers other than the customer of the first application 130. Alternatively, the set of available applications 130 may include applications associated with different customers.

The audit-log module 220 receives, from the first application, first log entries (operation 820). For example, the audit-log sidecar 150A may send buffered log entries in response to receipt of a communication from the audit-log service 160 that indicates that the audit-log service 160 has become available after a period of unavailability.

In operation 830, the audit-log module 220 receives, from the second application, second log entries that originated from the first application. Continuing with this example, the audit-log sidecar 150A (part of the first application) may have sent log entries that it generated to the audit-log sidecar 150B (part of the second application). The audit-log sidecar 150B may send buffered entries, both those generated by the application 130B and the application 130A, to the audit-log service 160 in response to receiving a communication from the audit-log service 160 that indicates that the audit-log service 160 has become available after the period of unavailability.

The first log entries, the second log entries, or both may be encrypted. For example, the audit-log service 160 may provide a different encryption key (e.g., a symmetric encryption key or a key from a public/private key pair) to each audit-log sidecar 150. Before sending audit-log entries to the audit-log service 160, the audit-log sidecar 150 encrypts the audit-log entries using the provided encryption key. The audit-log service 160 decrypts the encrypted audit-log entries (e.g., using the symmetric encryption key or the other key from the public/private key pair).

While the audit-log server 160 is unavailable, the log entries being sent to the second application may be encrypted using the key provided to the first application. Since the second application does not have the corresponding decryption key, the contents of the audit-log entries being buffered by the second application cannot be accessed by the second application. Thus, log entries provided by the second application that originated with the second application are encrypted using an encryption key for the second application while log entries provided by the second application that originated with the first application are encrypted using an encryption key for the first application. Since the second application does not have access to the encryption key for the first application, the second application cannot generate log entries that appear to have originated from the first application.

The alert module 230, in operation 840, generates an alert in response to a discrepancy between the first log entries and the second log entries. The alert may be an email or text message sent to an email address or a phone number associated with an administrator.

Though the method 800 is described as buffering log entries of a single (first) application by two (the first and second) applications, the method 800 is extensible to any number of applications. For example, each of the applications 130A-130D of FIG. 1 may provide log entries to one or more other applications 130A-130D (e.g., to the second application and a third application). Thus, by use of the method 800 for each of the applications 130A-130D, any corruption or modification of the log entries of any of the applications 130A-130D during unavailability of the audit-log service 160 can be detected when the audit-log service 160 becomes available again.

Figure 9:
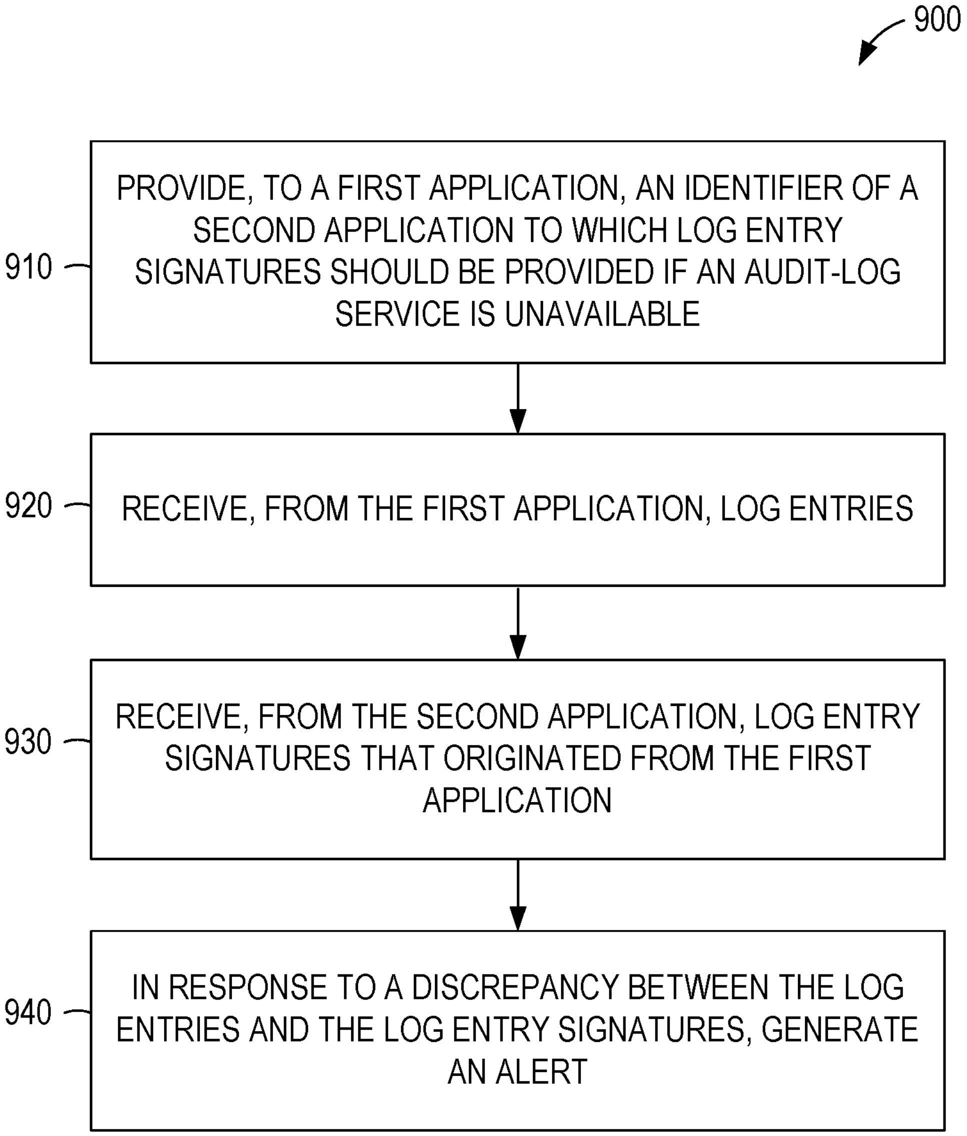
FIG. 9 is a flowchart illustrating operations of an example method suitable for generating an alert by an audit-log service based on data received from a log entry buffer extension network.

FIG. 9 is a flowchart illustrating operations of an example method 900 suitable for generating an alert by an audit-log service based on data received from a log entry buffer extension network. The method 900 includes operations 910, 920, 930, and 940. By way of example and not limitation, the method 900 is described as being performed by the audit-log service 160 of the application server 120C of FIG. 1, using the modules of FIG. 2 and the database schema of FIG. 3.

In operation 910, the audit-log module 220 provides, to a first application, an identifier of a second application to which log entry signatures should be provided if the audit-log service 160 is unavailable. For example, the audit-log service 160 may provide to the application 130A an identifier of the application 130B.

The audit-log module 220 receives, from the first application, log entries (operation 920). For example, the audit-log sidecar 150A may send buffered log entries in response to receipt of a communication from the audit-log service 160 that indicates that the audit-log service 160 has become available after a period of unavailability.

In operation 930, the audit-log module 220 receives, from the second application, log entry signatures that originated from the first application. Continuing with this example, the audit-log sidecar 150A (part of the first application) may have sent log entry signatures that it generated to the audit-log sidecar 150B (part of the second application). The log entry signatures may be generated by applying a cryptographic hash to the log entries. Since the cryptographic hash is irreversible, the second application cannot access the information of the log entries generated by the first application. The audit-log sidecar 150B may send buffered entries generated by the application 130B and buffered log entry signatures for log entries generated by the application 130A, to the audit-log service 160 in response to receiving a communication from the audit-log service 160 that indicates that the audit-log service 160 has become available after the period of unavailability.

The alert module 230, in operation 940, generates an alert in response to a discrepancy between the log entries and the log entry signatures. For example, the number of received log entries from the first application may be less than the number of log entry signatures received from the second application, indicating that one or more log entries were deleted after the signatures were sent to the second application and before the log entries were received by the audit-log service 160. As another example, the audit-log service 160 may apply the cryptographic hash to the received log entries to verify that the log entry signatures were correct. A mismatch between the generated and received signatures indicates that one or more log entries were modified after the signatures were sent to the second application and before the log entries were received by the audit-log service 160. Either of these conditions may indicate that the first application was compromised. The alert may be an email or text message sent to an email address or a phone number associated with an administrator.

Though the method 900 is described as buffering log entry signatures for log entries of a single (first) application by two (the first and second) applications, the method 900 is extensible to any number of applications. For example, each of the applications 130A-130D of FIG. 1 may provide log entries to one or more other applications 130A-130D (e.g., to the second application and a third application). As another example, the applications providing log entries may provide them to any number N of other applications, where N is a natural number. Thus, by use of the method 900 for each of the applications 130A-130D, any corruption or modification of the log entries of any of the applications 130A-130D during unavailability of the audit-log service 160 can be detected when the audit-log service 160 becomes available again.

In view of the herein described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: providing, by a server and to a first application, an identifier of a second application to which log entries should be provided if an audit-log service is unavailable; receiving, by the server from the first application, first log entries; receiving, by the server from the second application, second log entries that originated from the first application; and in response to a discrepancy between the first log entries and the second log entries, generating an alert.

In Example 2, the subject matter of Example 1 includes, prior to providing the identifier of the second application to the first application, randomly selecting the second application from a set of available applications.

In Example 3, the subject matter of Example 2, wherein the set of available applications comprise applications associated with different customers.

In Example 4, the subject matter of Examples 2-3, wherein the set of available applications excludes applications associated with customers other than a customer associated with the first application.

In Example 5, the subject matter of Examples 1~4 includes decrypting the first log entries using a private key of a public/private key pair; and decrypting the second log entries using the private key.

In Example 6, the subject matter of Examples 1-5 includes decrypting the first log entries using a symmetric key; and decrypting the second log entries using the symmetric key.

In Example 7, the subject matter of Examples 1-6 includes providing, to the first application, an identifier of a third application to which log entries should be provided if an audit-log service is unavailable; and receiving, from the third application, third log entries that originated from the first application.

Example 8 is a device comprising: a memory that stores instructions; and one or more processors configured by the instructions to perform operations comprising: providing, to a first application, an identifier of a second application to which log entries should be provided if an audit-log service is unavailable; receiving, from the first application, first log entries; receiving, from the second application, second log entries that originated from the first application; and in response to a discrepancy between the first log entries and the second log entries, generating an alert.

In Example 9, the subject matter of Example 8, wherein the operations further comprise: prior to providing the identifier of the second application to the first application, randomly selecting the second application from a set of available applications.

In Example 10, the subject matter of Example 9, wherein the set of available applications comprise applications associated with different customers.

In Example 11, the subject matter of Examples 9-10, wherein the set of available applications excludes applications associated with customers other than a customer associated with the first application.

In Example 12, the subject matter of Examples 8-11, wherein the operations further comprise: decrypting the first log entries using a private key of a public/private key pair; and decrypting the second log entries using the private key.

In Example 13, the subject matter of Examples 8-12, wherein the operations further comprise: decrypting the first log entries using a symmetric key; and decrypting the second log entries using the symmetric key.

In Example 14, the subject matter of Examples 8-13, wherein the operations further comprise: providing, to the first application, an identifier of a third application to which log entries should be provided if an audit-log service is unavailable; and receiving, from the third application, third log entries that originated from the first application.

Example 15 is a non-transitory computer-readable medium that stores instructions that, when executed by one or more processors of a device, cause the one or more processors to perform operations comprising: providing, to a first application, an identifier of a second application to which log entries should be provided if an audit-log service is unavailable; receiving, from the first application, first log entries; receiving, from the second application, second log entries that originated from the first application; and in response to a discrepancy between the first log entries and the second log entries, generating an alert.

In Example 16, the subject matter of Example 15, wherein the operations further comprise: prior to providing the identifier of the second application to the first application, randomly selecting the second application from a set of available applications.

In Example 17, the subject matter of Example 16, wherein the set of available applications comprise applications associated with different customers.

In Example 18, the subject matter of Examples 16-17, wherein the set of available applications excludes applications associated with customers other than a customer associated with the first application.

In Example 19, the subject matter of Examples 15-18, wherein the operations further comprise: decrypting the first log entries using a private key of a public/private key pair; and decrypting the second log entries using the private key.

In Example 20, the subject matter of Examples 15-19, wherein the operations further comprise: decrypting the first log entries using a symmetric key; and decrypting the second log entries using the symmetric key.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
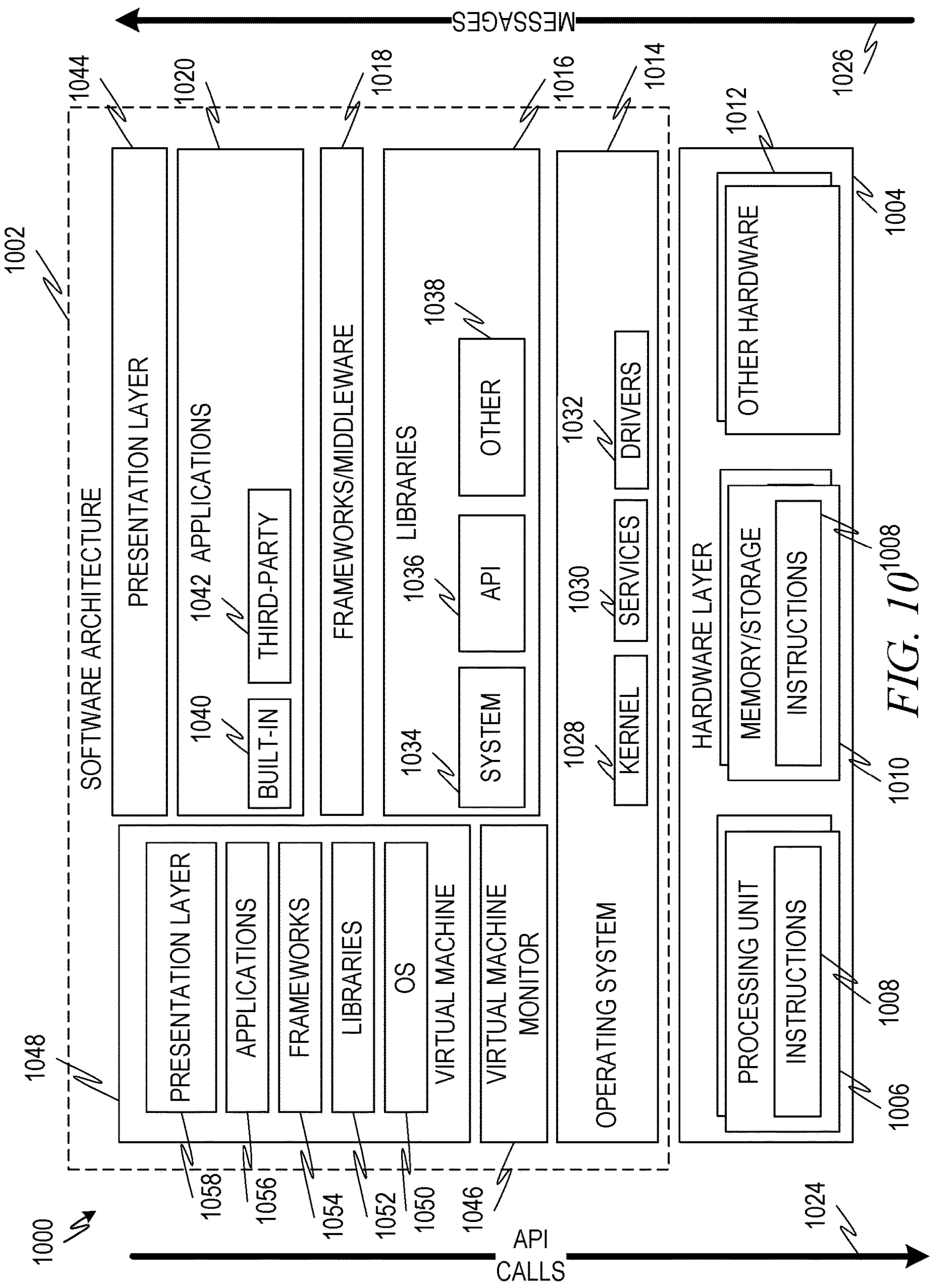
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture, and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides a particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke API calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the software architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and then store the output of that operation in a memory device to which it is communicatively coupled. A further hardware-implemented module may then, later access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across several machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages; and, it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry (e.g., an FPGA or an ASIC.)

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
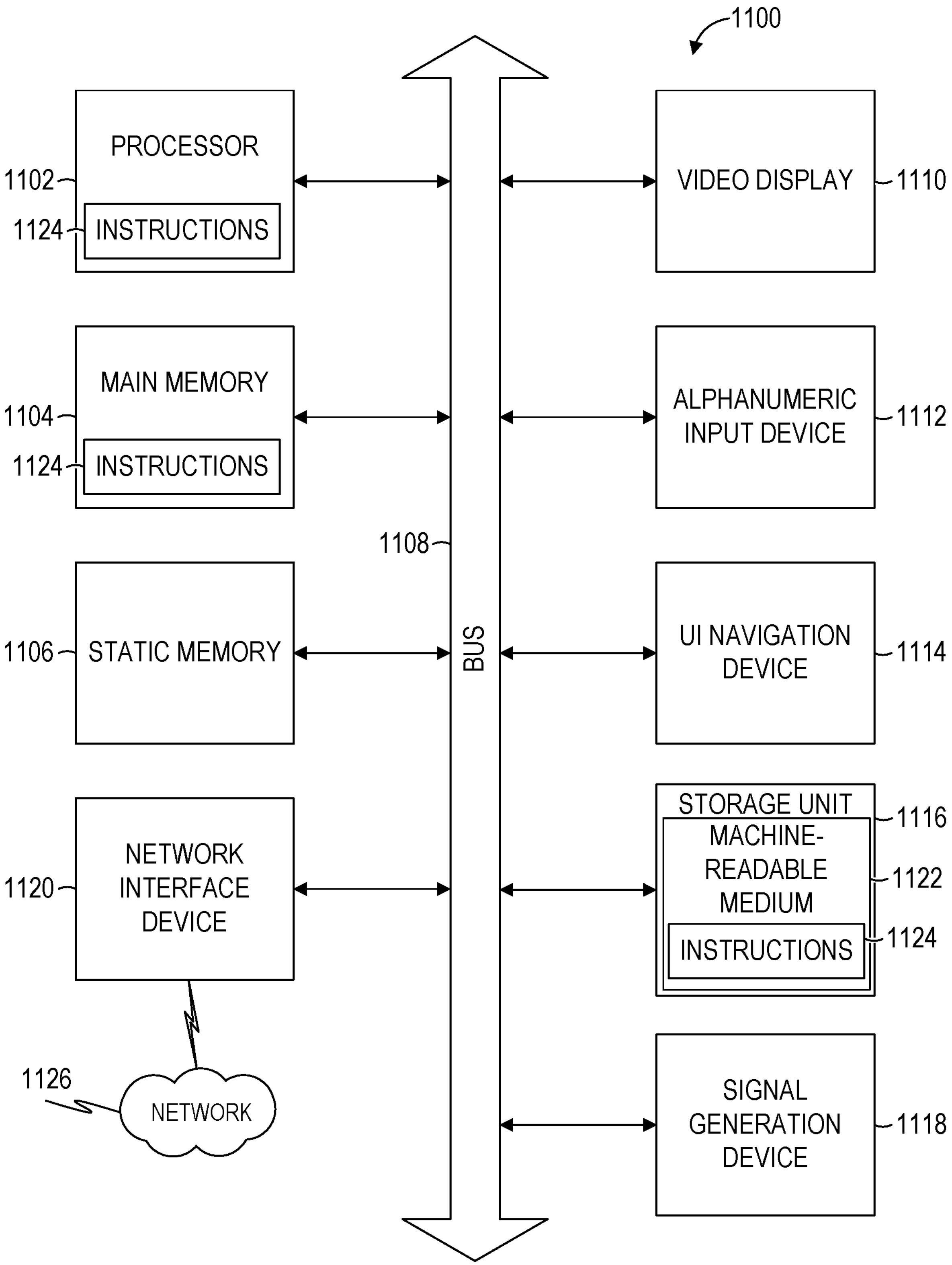
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, (e.g., erasable programmable read-only memory (EPROM), electrically erasable programmable read-only memory (EEPROM), and flash memory devices) magnetic disks such as internal hard disks and removable disks, magneto-optical disks, compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of several well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:

providing, by a server and to a first application, an identifier of a second application to which log entries should be provided if an audit-log service is unavailable;

receiving, by the server from the first application, first log entries;

receiving, by the server from the second application, second log entries that originated from the first application; and in response to a discrepancy between the first log entries and the second log entries, generating an alert.

2. The method of claim 1, further comprising:

prior to providing the identifier of the second application to the first application, randomly selecting the second application from a set of available applications.

3. The method of claim 2, wherein the set of available applications comprise applications associated with different customers.

4. The method of claim 2, wherein the set of available applications excludes applications associated with customers other than a customer associated with the first application.

5. The method of claim 1, further comprising:

decrypting the first log entries using a private key of a public/private key pair; and decrypting the second log entries using the private key.

6. The method of claim 1, further comprising:

decrypting the first log entries using a symmetric key; and decrypting the second log entries using the symmetric key.

7. The method of claim 1, further comprising:

providing, to the first application, an identifier of a third application to which log entries should be provided if the audit-log service is unavailable; and receiving, from the third application, third log entries that originated from the first application.

8. A device comprising:

a memory that stores instructions; and one or more processors configured by the instructions to perform operations comprising:

providing, to a first application, an identifier of a second application to which log entries should be provided if an audit-log service is unavailable;

receiving, from the first application, first log entries;

receiving, from the second application, second log entries that originated from the first application; and in response to a discrepancy between the first log entries and the second log entries, generating an alert.

9. The device of claim 8, wherein the operations further comprise:

prior to providing the identifier of the second application to the first application, randomly selecting the second application from a set of available applications.

10. The device of claim 9, wherein the set of available applications comprise applications associated with different customers.

11. The device of claim 9, wherein the set of available applications excludes applications associated with customers other than a customer associated with the first application.

12. The device of claim 8, wherein the operations further comprise:

decrypting the first log entries using a private key of a public/private key pair; and decrypting the second log entries using the private key.

13. The device of claim 8, wherein the operations further comprise:

decrypting the first log entries using a symmetric key; and decrypting the second log entries using the symmetric key.

14. The device of claim 8, wherein the operations further comprise:

providing, to the first application, an identifier of a third application to which log entries should be provided if the audit-log service is unavailable; and receiving, from the third application, third log entries that originated from the first application.

15. A non-transitory computer-readable medium that stores instructions that, when executed by one or more processors of a device, cause the one or more processors to perform operations comprising:

providing, to a first application, an identifier of a second application to which log entries should be provided if an audit-log service is unavailable;

receiving, from the first application, first log entries;

receiving, from the second application, second log entries that originated from the first application; and in response to a discrepancy between the first log entries and the second log entries, generating an alert.

16. The non-transitory computer-readable medium of claim 15, wherein the operations further comprise:

prior to providing the identifier of the second application to the first application, randomly selecting the second application from a set of available applications.

17. The non-transitory computer-readable medium of claim 16, wherein the set of available applications comprise applications associated with different customers.

18. The non-transitory computer-readable medium of claim 16, wherein the set of available applications excludes applications associated with customers other than a customer associated with the first application.

19. The non-transitory computer-readable medium of claim 15, wherein the operations further comprise:

decrypting the first log entries using a private key of a public/private key pair; and decrypting the second log entries using the private key.

20. The non-transitory computer-readable medium of claim 15, wherein the operations further comprise:

decrypting the first log entries using a symmetric key; and decrypting the second log entries using the symmetric key.

* * * * *